(12) United States Patent
Robert et al.

(10) Patent No.: US 8,843,413 B2
(45) Date of Patent: Sep. 23, 2014

(54) BINDING CONTENT TO A DOMAIN

(75) Inventors: Arnaud Robert, Redmond, WA (US); James M. Alkove, Woodinville, WA (US); Chadd B. Knowlton, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 2561 days.

(21) Appl. No.: 10/778,743

(22) Filed: Feb. 13, 2004

(65) Prior Publication Data

US 2005/0182727 A1 Aug. 18, 2005

(51) Int. Cl.
*G06F 21/10* (2013.01)
*H04N 21/436* (2011.01)
*H04L 29/06* (2006.01)
*H04N 21/835* (2011.01)

(52) U.S. Cl.
CPC ........ *H04L 63/123* (2013.01); *H04N 21/43615* (2013.01); *H04L 63/0823* (2013.01); *G06F 2221/0706* (2013.01); *G06F 21/10* (2013.01); *H04L 2463/101* (2013.01); *H04N 21/835* (2013.01)
USPC ................. 705/59; 705/51; 705/52; 713/168; 713/175; 713/155; 713/156

(58) Field of Classification Search
USPC .................. 705/54, 59, 50, 51; 726/5, 10, 26; 713/156, 157, 168, 175
See application file for complete search history.

(56) References Cited

U.S. PATENT DOCUMENTS

| | | | |
|---|---|---|---|
| 5,892,900 A * | 4/1999 | Ginter et al. ..................... | 726/26 |
| 6,327,652 B1 | 12/2001 | England et al. | |
| 6,330,670 B1 | 12/2001 | England et al. | |
| 6,453,305 B1 * | 9/2002 | Glassman et al. ............... | 705/59 |
| 6,484,182 B1 * | 11/2002 | Dunphy et al. ................ | 700/231 |
| 6,829,481 B2 * | 12/2004 | Souissi .......................... | 455/436 |
| 6,920,567 B1 * | 7/2005 | Doherty et al. .................. | 726/22 |
| 7,389,273 B2 * | 6/2008 | Irwin et al. ....................... | 705/59 |

(Continued)

FOREIGN PATENT DOCUMENTS

WO    WO 03/098931    11/2003

OTHER PUBLICATIONS

Collins English Dictionary—Complete and Unabridged 6th Edition 2003. © William Collins Sons & Co. Ltd 1979, 1986 © HarperCollins Publishers 1991, 1994, 1998, 2000, 2003; http://www.thefreedictionary.com/such.*

(Continued)

*Primary Examiner* — Mamon Obeid
(74) *Attorney, Agent, or Firm* — Micah Goldsmith; Sade Fashokun; Micky Minhas (57) ABSTRACT

The present invention provides for a digital rights management system with a centralized domain service capable of creating and managing membership criteria for joining a domain in accordance with business rules defined by a content owner. A domain identification is created that allows a content provider to uniquely bind content licenses to a domain. The content licenses include usage rights that define how content associated with the licenses may be consumed by one or more members of the domain. The centralized domain service can enforce digital rights by validating membership criteria including at least one of a domain proximity check for validating that a requestor is in close proximity to the domain, a total number of requestors, or the frequency that the requests have been made by various requestors to join the domain and unjoin from the domain.

19 Claims, 6 Drawing Sheets

(56) References Cited

U.S. PATENT DOCUMENTS

| | | | |
|---|---|---|---|
| 7,395,244 B1* | 7/2008 | Kingsford | 705/52 |
| 7,512,987 B2* | 3/2009 | Williams | 726/27 |
| 7,523,071 B2* | 4/2009 | Fox et al. | 705/52 |
| 7,627,144 B2* | 12/2009 | Abe | 382/115 |
| 7,644,044 B2* | 1/2010 | Candelore | 705/57 |
| 7,793,105 B2* | 9/2010 | Korkishko et al. | 713/175 |
| 7,966,261 B2* | 6/2011 | Candelore | 705/57 |
| 8,060,444 B2* | 11/2011 | Kalker et al. | 705/51 |
| 8,103,591 B2* | 1/2012 | Bouchet | 705/59 |
| 8,291,057 B2* | 10/2012 | Jeong et al. | 709/223 |
| 8,667,108 B2* | 3/2014 | Jeong et al. | 709/223 |
| 8,676,878 B2* | 3/2014 | Jeong et al. | 709/202 |
| 2002/0013772 A1 | 1/2002 | Peinado | |
| 2003/0005246 A1 | 1/2003 | Peinado | |
| 2003/0187801 A1 | 10/2003 | Chase et al. | |
| 2003/0194092 A1 | 10/2003 | Parks et al. | |
| 2003/0194093 A1 | 10/2003 | Evans et al. | |
| 2003/0195855 A1 | 10/2003 | Parks et al. | |
| 2004/0103312 A1* | 5/2004 | Messerges et al. | 713/201 |
| 2005/0071280 A1* | 3/2005 | Irwin et al. | 705/59 |
| 2005/0192902 A1* | 9/2005 | Williams | 705/51 |
| 2006/0123485 A1* | 6/2006 | Williams | 726/27 |
| 2007/0124252 A1* | 5/2007 | Higashi et al. | 705/59 |
| 2008/0027869 A1* | 1/2008 | Kalker et al. | 705/59 |
| 2008/0222258 A1* | 9/2008 | Kwon et al. | 709/206 |
| 2008/0249946 A1* | 10/2008 | Candelore | 705/59 |
| 2008/0250504 A1* | 10/2008 | Kwon et al. | 726/26 |

OTHER PUBLICATIONS

Gassan Chaddoud, et al., "A Secure SSM Architecture", 10th IEEE International Conference on Networks, Aug. 2002, pp. 343-348.

Deok-Gyu Lee, Im-Yeong Lee, Jong-Keun Ahn, and Yong-Hae Kong, "The Illegal Copy Protection Using Hidden Agent", EurAsia-ICT 2002: Information and Communication Technology: First EuAsian Conference, Shiraz, Iran, Oct. 29-31, 2002, vol. 2510, pp. 832-841.

Patrick Mannion, "Last Digital-TV Issues Get Resolved as Industry Gears Up for Prime Time", Electronic Design, vol. 48, Issue No. 8, Apr. 17, 2000, pp. 85-97.

Hyeonjeong Mun, Sooho Ok and Yongtae Woo, "A Digital Content Management Model for Making Profits in Digital Content Sites", Digital Libraries: People, Knowledge and Technology, Proceedings: 5th International Conference on Asian Digital Libraries, ICADL 2002, Singapore, Dec. 11-14, 2002, pp. 516-517.

Dalit Naor and Moni Naor, "Protecting Cryptographic Keys: The Trace-and-Revoke Approach", IEEE Computer Society, vol. 36, Issue No. 7, Jul. 2003, pp. 47-53.

Brian Smith, "Fort TV", IEEE Spectrum, vol. 40, Issue 5, May 2003, pp. 30-32.

Changsheng Xu and David Dagan Feng, "Web-Based Protection and Secure Distribution for Digital Music", Proceedings: IASTED International Conference, Internet and Multimedia Systems and Applications, Aug. 13-16, 2001, Honolulu, Hawaii, pp. 102-107.

Smart Right, Technical White Paper, Version 1.7, Jan. 2003, Thomson, 2003, pp. 1-19.

Van den Heuvel, S.A.F.A, "Secure Content Management in Authorised Domains" International Broadcasting Convention, Sep. 15, 2002, pp. 467-474.

Ripley, M., et al., "Content Protection in the Digital Home," *Intel Technology Journal*, Interoperable Home Infrastructure, vol. 6, Issue 04, Published Nov. 15, 2002, pp. 49-56.

* cited by examiner

BINDING CONTENT TO A DOMAIN

CROSS-REFERENCE TO RELATED APPLICATIONS

N/A.

BACKGROUND OF THE INVENTION

1. The Field of the Invention

The present invention generally relates to digital rights management. More specifically, the present invention relates to digital rights management within a domain.

2. Background and Related Art

Due in part to concerns over the distribution of copyrighted digital content (such as digital audio, digital video, digital text, digital data, digital multimedia, etc.) to users for consumption, digital rights management (DRM) has become highly desirable. Typical modes of distribution of such content include tangible devices such as magnetic (floppy) disk, magnetic tape, optical (compact) disk, etc., and intangible media such as electronic bulletin boards, electronic networks, the Internet, etc. Upon being received by the user, such users consume the content by rendering, playing or otherwise interacting with the digital content with the aid of an appropriate rendering device such as a media player, personal computer, or the like.

Typically, a content provider, or rights-owner, such as an author, publisher, broadcaster, etc. (hereinafter "content owner"), wishes to distribute such digital content to a user or a recipient in exchange for a license fee or some other consideration. Usually, content owners wish to restrict what the user can do with such distributed digital content. For example, the content owner may restrict the user from copying and re-distributing such content to a second user. Traditionally, content owners have used DRM to bind content to a specific device.

Figure 1:
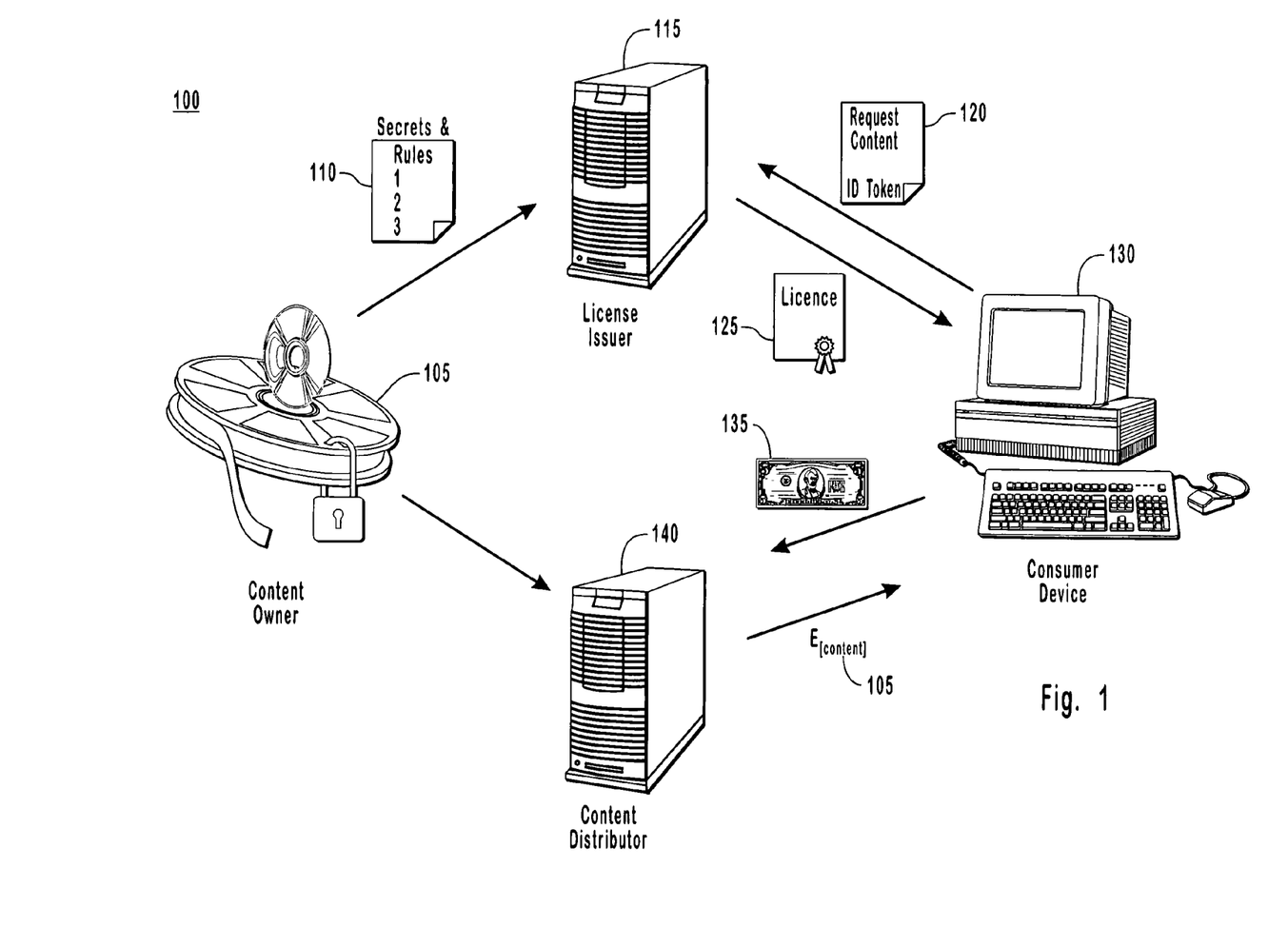
FIG. 1 illustrates an example of a typical digital rights management system that binds content to a particular device through the distribution of a license that is device specific.

FIG. 1 illustrates an example of a DRM system 100, which allows a content owner to bind content to a specific device. In general, the licensing process is initiated by the content owner encrypting content and packaging and distributing the content to consumers via the Internet, CD, or other conventional means. Consumers may then receive a license for consuming the content in accordance with the business rules defined by the content owner. As noted above, traditionally these rules have required that the content be bound to a specific device. For example, the following describes how a license may be used to bind content to a specific device in accordance with a typical DRM model.

A content owner usually encrypts and packages the content in accordance with any number of well known processes. Typically, however, the content will be packaged to include the encrypted content and a header portion that includes information to assist a device in consuming the content. Further, the packaged content may use a license acquisition URL to point to a location where a license may be acquired. Moreover, there is a number of other optional and important data which may be included within the packaged file, e.g., private signing key used to sign the content header, license key seed used to generate the key that is shared between content owner and license issuer, etc.

The content 105 may be sent to a content distributor 140 and placed on a web or file server or streaming server for distribution. Devices 130 receiving the content may then be directed to the license acquisition URL that is embedded within the header (or other areas) of the file to acquire the appropriate license 125 for consuming content 105. Before license 125 can be requested and distributed by license issuer 115, the content owner sends to the license issuer 115 the business rules and sharing of secrets 110, which typically include the seed, public key and the business rules by which a license 125 will be granted. The rules 110 define how and under what conditions licenses may be distributed to users. For example, the rules may allow for the distribution of digital content to be played only a limited number of times, only for a certain total time, only on a certain type of machine, only on a certain type of media player, only by a certain type of user, etc. In any event, the license issuer 115 should be trusted in order to ensure that licenses 125 are issued in accordance with the appropriate business rules or requirements 110 as specified by the content owner.

Device 130 may obtain the content 105 from the content distributor 140 after paying such consideration 135 as defined by the content owner when the content 105 is sent to the content distributor 140. As previously mentioned, in order to play the encrypted content 105 the device 130 must first obtain a license 125 from the license issuer 115. Device 130 may use the license acquisition URL within the header of the encrypted content 105 to determine who the license issuer 115 is in order to make a request 120 for a license 125. A request process may then be initiated which includes exchanging the content identification, information about the client computer 130 and other optional information. Based on the information received, the license issuer 115 responds with an appropriate license 125 allowing the device 130 to consume the encrypted content 105.

This license will typically include the encrypted key to decrypt the content, the specified usage rights, information about the device 130, and other information. As previously mentioned, in order to tightly control the consumption of the content 105 the license is bound to particular device or client computer 130 (e.g., the license is valid only for device 130 and content 105), and therefore the content usually can be consumed only by the specific device 130.

With competing interests of consumers, which desire the ability to consume the content on any number of devices (e.g., a desktop computer, a laptop computer, a handheld device, devices within a car or home audio/visual system/network), various mechanisms have been created to extend licenses for consuming content to a set of devices that share both content and license. Sharing the same content and license on any of several devices more closely approximates the user experience for tangible media, such as a CD, which may be played on any of several devices or even loaned to another. Current solutions for extending a license to a set of devices, however, rely on individual peer devices to enforce the criteria for sharing licenses and content.

Figure 2:
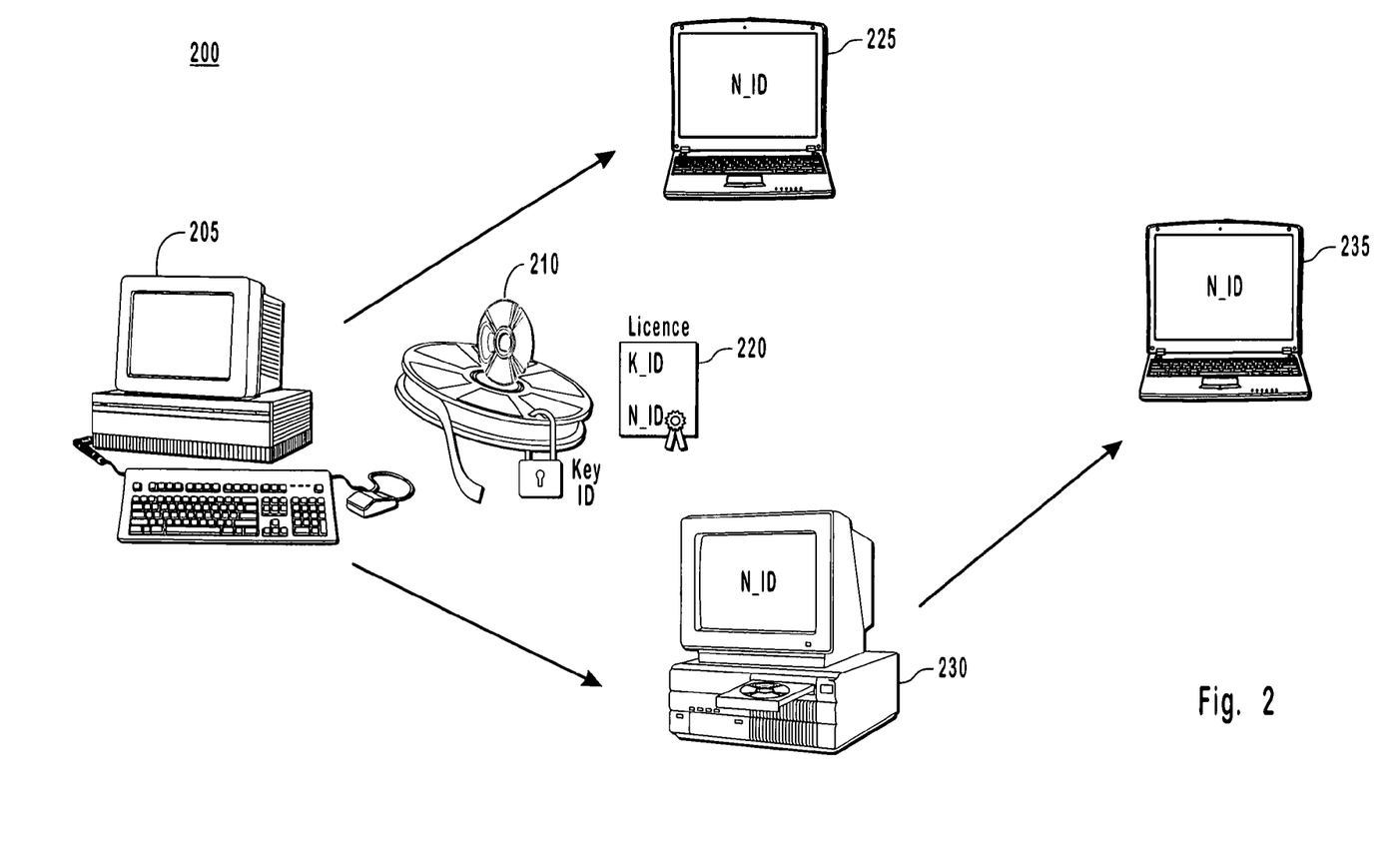
FIG. 2 illustrates an example of a typical distribution of content within a domain.

FIG. 2 illustrates an example implementation of distributing content and a license within a network 200 that includes multiple devices. Initially, device 205 requests and obtains content 210 and license 220 in accordance with a procedure similar to the one described above with regard to FIG. 1. Content 210 is encrypted, and license 220 binds license 220 to content 210 through a key identifier (K_ID) that is specific to content 210. Rather than binding the license to a particular device, however, license 220 includes a device ecosystem or network identification (N_ID) which may be now distributed to other devices via device 205 (or other devices within the network 200) thereby allowing content 210 to be bound to those devices within the network 200. For example, network device 225 may request from device 205 the content 210 and the license 220 for consumption. Provided that device 225 has a N_ID that matches the N_ID within license 220, device 225 is able to use license 220 to consume content 210. Similarly, device 230 may obtain the license 220 and content 210 from device 205, and subsequently distributed the license 220 and content 210 to device 235. If device 235 has obtained the appropriate N_ID the content 210 may be consumed in accordance with license 220 and in accordance with the business rules defined therein.

One of the problems associated with the aforementioned distribution of content within a network is that there is no central network service to ensure that network membership criteria are not abused. For example, a network may be limited to a specific number of devices, say four. This limitation is intended to provide a reasonable restriction on the size of the domain, given a particular license agreement. One way that the limitation on the number of device could be circumvented is to share the four licenses among a much larger group of devices. To illustrate how this might occur, consider content that is twelve minutes in length, which therefore could be played five times an hour, 120 times a day, 840 times a week, and so forth. The four device limit introduces a factor of four, meaning that the content theoretically can be played 20 times an hour, 480 times a day, 3,360 times a week, and so forth.

Of course, no matter how much four consumers like the content, as a practical matter, they will not play the content 3,360 times a week. However, it is possible for other devices to make use of the 3,360 potential plays of the content each week. In order to play the content, a device must be part of (i.e., a member of) a licensed network, but after the content is played (or at a time when the content is not being played) there may not be a significant reason for a device to remain as a network member. As a result, a device may join a network for the sole purpose of playing the content and then unjoin after the content has been consumed. This process of joining and unjoining effective allows a four device domain to share licensed content among a much larger group of devices. In this example, the number of devices could theoretically be as large as 3,360 over the course of a single week, which is probably a much larger group of devices than was contemplated when the four-device domain license was issued for the content. At first, sharing domain membership in this way may appear analogous to sharing a physical CD, which seems reasonable and in some aspects is desirable. However, there are practical limits on how many times a physical medium, such as a CD, can be shared over time, which simply do not manifest themselves in the context of an electronic or digital medium, such as a computer network.

Current network technology, such as network 200 in FIG. 2, have not accounted for how frequently devices enter and leave the network. At least in part, this may be attributed to the lack of a centralized network service that for enforcing network membership criteria. A set of devices like network 200 also have failed to manage, and in some cases purposefully so, for the proximity of devices that make up a network. Again, analogizing to a physical media paradigm, sharing a CD typically involves at least intermittent proximity.

BRIEF SUMMARY OF THE INVENTION

In accordance with exemplary embodiments of the present invention, the above-identified deficiencies and drawbacks of current digital rights management systems (DRMs) are overcome. For example, the present invention provides a rights management system that protects content from being consumed by unauthorized devices. In particular, the present invention provides for methods, systems and computer program products for enforcing digital rights within the confines of the content license used when consuming content within a domain through the validation of domain membership criteria.

Example embodiments provide for receiving a request to create a domain, whereupon a domain identification is created that allows a content provider to uniquely bind content licenses to a domain. The content licenses include usage rights that define how content associated with the licenses may be consumed by one or more members of the domain. Thereafter, or simultaneously, the centralized domain service may receive a request from a requestor to become a member of the domain. The centralized domain service can enforce digital rights by validating membership criteria including at least one of a domain proximity check for validating that a requestor is in close proximity to the domain, a total number of requestors, or the frequency that the requests have been made by various requestors to join the domain and unjoin from the domain. Upon validation of the membership criteria, a domain certificate that includes the created domain identification is sent to the requestor.

Other example embodiments of the present invention provide for a domain identification that is sent to the requestor expires within a time period set by the centralized domain service. Thereafter, a renewal request may be received by the centralized domain service to extend the domain identification expiration time period.

In further example embodiments provide that the requestor receives a token from a domain manager, which created the domain, to send to the centralized domain service for validating that the requester is in close proximity to the domain manager. For example, the token may include information about the time it took the requestor to receive the token, the number of intermediary nodes that the token traveled across before the requestor received the token, etc.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for enforcing digital rights within a domain. The embodiments of the present invention may comprise a special purpose or general-purpose computer including various computer hardware, as discussed in greater detail below.

The present invention provides for a domain that allows more flexible content usage across a variety of devices while preventing mass re-distribution of content to, e.g., the Internet. Example embodiments provide for a central domain service that is an authority capable of granting and creating the existence of a domain in accordance with certain rules, set forth or agreed to by the content provider and frequency based on business rules defined by the content owner. Content providers will require certain attributes or restrictions called member criteria for domains. For example, the membership criteria may specify the number of devices that can join a domain, the expiration of a domain (e.g., a predetermined fixed time period) or individual licenses within a domain, the proximity or how close a device must be to other devices within the domain, the rate at which devices are allowed to join and unjoin, etc.

Although the consumer may choose a content provider as a function of the attributes offered, content providers and owners generally dictate at least some of the domain membership criteria consumers should meet in order to access content controlled by the providers. Some content providers may elect to have membership criteria validated on several different centralized domain services for various purposes. For example, the content provider and/or consumers may choose a central domain service based on such things as proximity, speed, bandwidth, reliability, cost, etc. In addition, the content provider may offer varying criteria through different domain services as a function of the consideration given by the consumer. For example, a content provider may offer a consumer more devices within a domain for additional money paid by the consumer, and can therefore direct the consumer to the appropriate domain service based on the desired attributes. In any event, because of the varying domain services available, domain services are uniquely identifiable, and domains are uniquely identifiable within the scope of their domain service.

Figure 3:
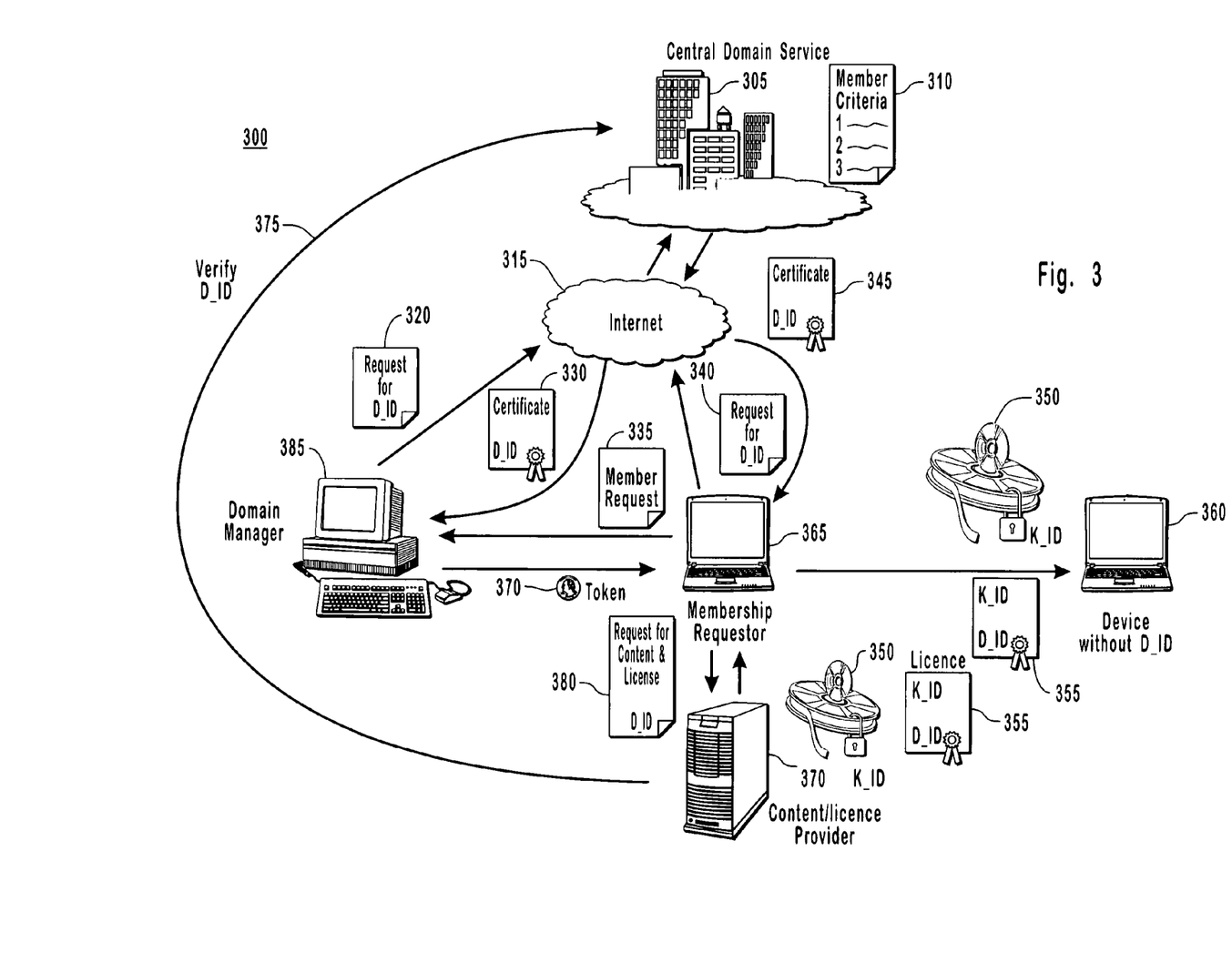
FIG. 3 illustrates how protected content and licenses are distributed within a domain using a centralized domain service in accordance with example embodiments of the present invention.

FIG. 3 illustrates the distribution of content and licenses throughout a domain 300 that is controlled by a central domain service 305. Example embodiments provide for a domain manager 385 that initiates a request 320 for creating a domain 300 capable of binding content to the domain through the use of a domain identification (D_ID). Accordingly, domain manager 385 establishes a connection to the centralized domain service 305 through, e.g., the Internet 315 and requests 320 a D_ID. It is noted that although FIG. 3 illustrates the centralized domain service 305 as a cloud server, the centralized domain server could be a device or limited group of devices, as described in greater detail below. Accordingly, the illustration of the centralized domain service 305 as a cloud server is for illustrative purposes only and is not meant to limit or otherwise narrow the scope of the invention.

In any event, upon receipt of the request 320 for a D_ID, the central domain service 305 may grant a domain certificate 330 to the domain manager 385 of the newly created domain 300. The domain certificate 330 includes (among other information) the D_ID, which as described in greater detail below uniquely identifies (at least within the central domain service 305) the domain 300 and binds the licenses associated therewith to that particular domain 300.

Thereafter, devices associated with the domain 300 can become members by requesting 340 D_ID from the central domain service 305. For example, membership requestor 365 that now wishes to join the domain 300 will need to obtain a similar certificate 340 as received by the domain manager 385 that includes, among other things, the D_ID. Accordingly, membership requestor 365 will need to make a request 340 for the D_ID to the central domain service 305. The request 340 for the D_ID should contain, among other things, device specific information in order to bind the D_ID to the device making the request, which ensures that D_ID cannot be transferred to and used by other devices. Upon receipt of the request 340 for the D_ID, the central domain service 305 will validate that member criteria 310 defined by content provider 370 are satisfied before a certificate 345 can be issued.

In accordance with example embodiments, one of the member criteria 310 that the central domain service 305 may need to verify or validate in order to allow a device to become a member of the domain 300 is known as a "proximity" check. This criterion establishes that the device 365 making the request 340 for the D_ID is not too far removed from the domain 300. In order to satisfy this criterion, membership requestor 365 should first request to become a member 335 of the domain and make such request to domain manager 385. Domain manager 385 can then send, e.g., a token 370 to the membership requestor 365.

When membership requestor 365 now makes the request 340 for the D_ID from the central domain service 305 via, e.g., the Internet 315, it may include the token 370 in the request 340. The central domain service 305 will use the token 370 to ensure that membership requestor 365 is "proximally" close to domain manager 385 in accordance with the business rules defined for creating such domain 300. Such validation or verification may be in the form of determining the time that it took the token to travel from the domain manager 385 to membership requestor 365, the roundtrip time (e.g., where the domain manager 385 is part of the centralized domain service 305), the number of hops or intermediary nodes that the token traveled between domain manager 385 and membership requestor 365, etc. Of course, other well-known means of determining proximity may also be used in the validation process.

Other example embodiments provide that other membership criteria 310 may include a restriction on the number of memberships that are available. For example, the content owner may restrict the number of devices that can be in a domain at any one particular time. Alternatively, or in conjunction, the membership criteria 310 may restrict the types of devices based on the functionality of such device. For example, a first count limit may apply to devises capable of storing the content or to devices capable of distributing the content outside the domain. A second count limit may apply to devises capable of rendering the content or those devices cable of acquisitioning the content, i.e., capable of bringing content into the domain. Of course any number of device attributes or other considerations might be used to limit the device count, and therefore the above features for limiting the number of devices are used for illustrative purposes only and are not meant to limit or otherwise narrow the scope of the invention.

In further example embodiments, the centralized domain service may enforce digital rights by validating the velocity that membership requesters 365 join and unjoin the domain. In particular, centralized domain service 305 will check to see the frequency that one or more requests 340 have been made by various requesters 365 to join the domain and unjoin from the domain. This helps prevent large numbers of users from sharing a small number of licenses. For example, embodiments allow for devices to join and unjoin from the domain, but may only allow for a specified number of devices to be members at any one particular time. Accordingly, without the velocity control, users could continually join and unjoin from the domain as needed to allow an overly broad number of users to become members of the domain, which would potentially circumvent the intended number of device restriction set by the content owner.

It should be noted that any number of member criteria 310 can be validated in accordance with business rules and models set forth by content owners. Accordingly, the above-identified examples of member criteria 310 are used for illustrative purposes only and are otherwise not intended to limit the present invention to just those criteria 310.

In any event, once centralized domain server 305 has validated member criteria 310 a certificate 345 can be issued to member requestor 365, which includes the D_ID that binds license 355 to the domain 300. As previously mentioned, the certificate (and thus the D_ID within the certificate) should be devices specific in order to ensure that the D_ID cannot be freely transferred between devices.

Once the membership requestor 365 has obtained the appropriate D_ID, the device 365 will be able to request 380 content and licenses from a content/license provider 370 in accordance with a similar process as that previously described regarding typical domain rights management (DRM) services. It should be noted that any device within the domain, including the domain manager 385, can obtain the content 350 and the license 355 from the content/license provider 370. In any event, the device making the request (365 in this case) should provide the D_ID within the request 380 to the content/license provider 370. The content/license provider 370 may then verify 375 the D_ID with the central domain service 305. Upon verification, the content/license provider 370 may send content 350 and license 355 to the device 365. The content is encoded and includes a key identification (K_ID), which is also included in the license 355 in order to bind the encrypted content 350 to the license 355. Further, license 355 includes the D_ID, which now binds the license 355 to the domain 300 as well as the content 350.

As discussed above, because the content is bound to the license 355, which is also bound to the D_ID, and because D_IDs are machine specific, and therefore non-transferable, the content 350 and the license 355 associated with the domain may now be freely transferred among the devices of the domain without concern of wide distribution. In other words, other devices, e.g., 360, without the appropriate D_ID are unable to consume the content even if they receive content 350 and license 355 from a subsequent device, e.g., 365. In order for such a device 360 to be able to consume content 350 it must go through a similar process for requesting a D_ID as previously described.

In another example embodiment, a time period expiration and renewal feature may be placed on the D_ID, certificate 345 associated with the D_ID, or both. Accordingly, in this embodiment, when the centralized domain service 305 issues the certificate 345, the time period expiration feature disables the use of the license 355, and thus consumption of content 350 when the predetermined time period has ended. Although the term "time period" is used, it is not necessarily limited to a time dependency. For example, time period is used to also include the number of times that content may be consumed, a time period to consume only small sample of the full content, an hour, day, week or any other such time restriction, etc. Accordingly, time period is used as a general term and reference only.

In any event, as mentioned above, the present invention also includes a renewal feature. Accordingly, upon expiration of the time period, i.e., when the content has been consumed a particular number of times, for a duration of time, etc., the device can make a request for renewal of D_ID or certificate. The request should be made to the central domain service 305, which can again validate membership criteria 310 and either issue another temporary or permanent certificate/D_ID.

Also related to the expiration feature, the present invention provides for a revocation of a domain ID or a specific certificate. Accordingly, the central domain service may revoke the entire domain by revoking the D_ID, or can revoke a single user's (or multiple users) right to continue to be a part of the domain membership.

Figure 4:
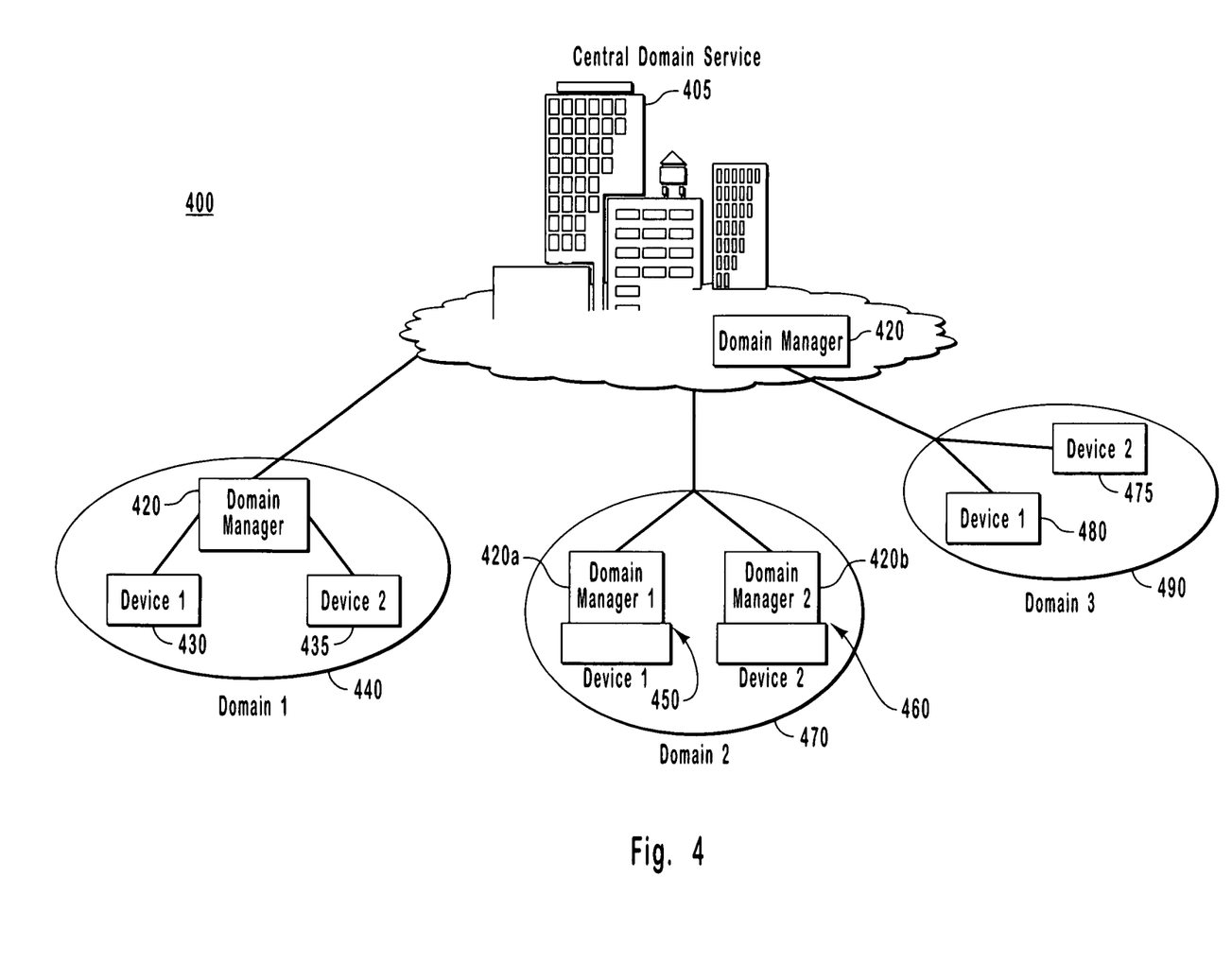
FIG. 4 illustrates a centralized domain service and the location of a domain manager within such service in accordance with example embodiments of the present invention.

It is important to note that a domain manager may reside on a particular device, be spread amongst multiple devices of the domain or exist on the domain service itself depending upon the device capabilities and the trust chain between the domain service and the devices. FIG. 4 illustrates various examples of where a domain manager may reside within the domain service 400 in accordance with example embodiments. As shown, domain manager 420 may reside within domain 1 (440) and service both device 1 (430) and device 2 (435). Alternatively, the domain manager 420 may be spread to multiple devices as illustrated in domain 2 (470), wherein domain manager 1 (420a) resides on device 1 (450) and domain manager 2 (420b) exits in device 2 (460). Still yet other embodiments provide that the domain manager 420 may sit on central domain service 405 as illustrated in domain 3 (490). The domain manager 420 may then service device 1 (480) and device 2 (475) within domain 3 (490).

Regardless of where the domain manager resides within a domain, devices are uniquely identifiable to the domain manager, and domains are uniquely identifiable to the domain service. Further, the present invention provides that any device can act as the domain service and/or the domain manager and the domain manager can validate membership criteria. For example, in the case where the domain manager is included in the centralized domain service, the creation or initialization of the domain (e.g., the receipt of the private/public key pair, domain identifier, etc.) may be obtained from another centralized domain service. All other membership criteria, however, such as proximity check, limitations on total number of devices, limitations of types of devices, velocity for joining and unjoining, etc. can be performed by the domain manager.

Further example embodiments provide that the validation of membership criteria can be spread across a limited number of devices. For example, one device could be the central domain service with limited management capabilities, e.g., just the domain creation. In such a case, other devices within the domain may be self-managing. In such a case, the content licenses could contain restrictions with respect to playback that could include, e.g., a number of devices or a list of devices that can join the domain. Accordingly, one device could only send domain certificate, license, content, or any combination thereof, to another device if the latter is on the list or according to some other criteria.

Other example embodiments provide that the domain service can revoke a domain and a domain manager can revoke a member device. Further, a domain manager is capable of managing more than one domain at a time. Moreover, the domain may be self-managed, in that it does not require a permanent administrator to maintain it.

Still yet other embodiments of the present invention provide that the device may become a member of more than one domain. Typically, however, if a device acquires a second domain identification, the first domain identification or previous domain identifications are temporarily disabled. Accordingly, even though a device may contain more than one domain identification, the device is bound to only one particular domain at any given time.

The present invention may also be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving particular results. Although the functional steps and non-functional acts may be described or claimed in a particular order, the present invention is not necessarily limited to any particular ordering or combination of acts and/or steps.

Figure 5:
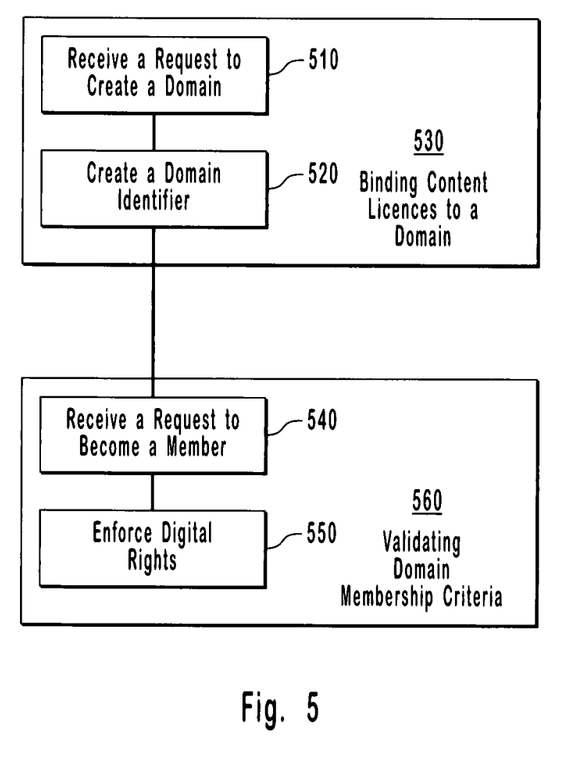
FIG. 5 shows example acts and steps for methods of enforcing digital rights within a domain by validating membership criteria.

FIG. 5 illustrates example steps and acts used in a rights management system that protects content from being consumed by unauthorized devices. Methods and computer program products for implementing such methods enforce digital rights within the confines of a content license used when consuming content within a domain by validating domain membership criteria. For example, a step for binding 530 content licenses to a domain may include the act of receiving 510 a request to create a domain. Further, the step for binding 530 may include the act of creating 520 a domain identification that allows a content provider to uniquely bind content licenses to a domain. The content licenses will comprise the usage rights that define how content associated with the license may be consumed by members of the domain.

A step for validating 560 domain membership criteria may include the act of receiving 540 a request, by a requestor, to become a member of the domain. The request may be received at the centralized domain service and may include a way of validating the proximity of the requester within the domain. For example, the requestor could request a token from a domain manager, which requested the creation of the domain, and subsequently send the token to the centralized domain service for validating that the requestor is in close proximity to the domain. The token may include information about the time it took the requestor to receive the token, round trip time (e.g., in the case where the domain manager is included in the centralized domain service), or the number of intermediary nodes that the token traveled across before the requestor received the token, or both.

The step for validating 560 domain membership criteria may also include the enforcement 550 of digital rights at the centralized domain service by validating the at least one of a total number of requestors or the frequency that one or more requests have been made by various requesters to join the domain or unjoin from the domain, or both. Upon validation of the domain membership criteria, the centralized domain service may send a domain certificate that includes the created domain identification to the requestor.

The domain identification may include an expiration time period sent by the centralized domain service in accordance with rules established by the content owner. Subsequently, the centralized domain service may receive a renewal request to extend the domain identification expiration time period. Other embodiments also provide that the centralized domain service may revoke the domain identification or domain membership for one or more members of a particular domain.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 6:
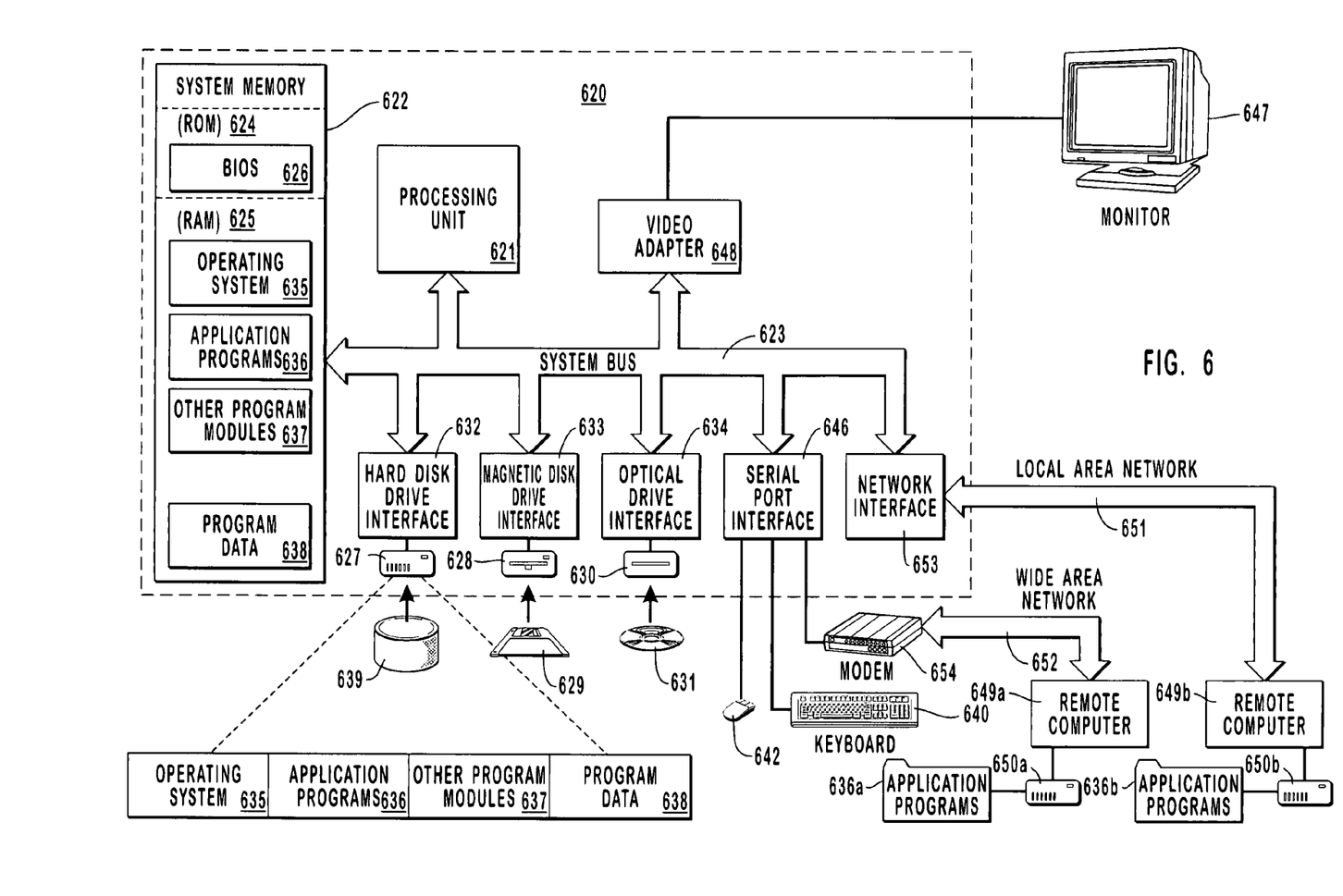
FIG. 6 illustrates an example system that provides a suitable operating environment for the present invention.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an example system for implementing the invention includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 639, magnetic disk 629, optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, a peer device or other common network node, and typically include many or all of the elements described above relative to the computer 620, although only memory storage devices 650a and 650b and their associated application programs 636a and 636b have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a central domain server in a rights management system that protects content from being consumed by unauthorized devices in a wide area network, the central domain server configured to enforce domain membership for other computing devices that request access to digitally protected content in the wide area network, a method of enforcing digital rights within the confines of a content license used when consuming content within a domain by validating domain membership criteria set by a content provider, the method comprising acts of:

the central domain server receiving a first request from a first computing device for creating a domain and for receiving a domain identification for the domain;

in response to the first request, the central domain server creating a first domain certificate for the first computing device, the first domain certificate including the domain identification, the domain identification uniquely binding content licenses to the domain, the content licenses comprising one or more usage rights that define how content associated with the licenses may be consumed by any members of the domain;

the central domain server sending the first domain certificate to the first computing device such that the first computing device is established as a member of and the domain manager for the domain;

the central domain server subsequently receiving a second request generated by the second computing device, the second request for the second computing device becoming a member of the domain and for the second computing device receiving the domain identification, the second request including device specific information uniquely identifying the second computing device;

in response to the second request, the central domain server enforcing digital rights by validating domain membership criteria set by the content provider through at least both of (1) a velocity check that determines how many requestors have both joined and unjoined from the domain within a predetermined period of time; and (2) a proximity check that checks how close the second computing device is to the first computing device, the domain membership criteria defines a minimum proximal closeness required of the second computing device relative to the first computing device;

upon validation of the domain membership criteria that a predetermined frequency of requestors both joining and unjoining the domain over the predetermined period of time has not been exceeded, the central domain server creating a second domain certificate for the second computing device, the second domain certificate including the device specific information and the domain identification;

the central domain server sending the second domain certificate to the second computing device for establishing the second computing device as member of the domain;

the central domain server receiving a third request from the content provider for verifying the domain identification, the third request including the domain identification sent by the content provider when the content provider receives a request for content from a member of the domain; and in response to the third request, the central domain server sending a verification to the content provider that the domain identification is valid, such that the central domain server centrally regulates content access for both the first and second computing devices through membership in the domain in accordance with the desires of the content provider.

2. The method of claim 1, wherein the domain identification expires within a time period set by the centralized domain service.

3. The method of claim 2, further comprising the acts of:
receiving, at the centralized domain service, a renewal request to extend the domain identification expiration time period.

4. The method of claim 1, wherein the domain membership criteria further includes at least a total number of requestors to join the domain and unjoin from the domain.

5. The method of claim 1, wherein receiving the second request includes receiving the proximity data in the second request, and wherein receiving the proximity data includes identifying at least one of the time it took a token that includes the proximity data to travel from the first computing device to the second computing device, or the number of intermediary nodes that the token traveled across between the first computing device and the second computing device.

6. The method of claim 5, wherein the centralized domain service includes the domain manager, and wherein the domain manager requested the creation of the domain from a centralized domain server, which created the domain identification.

7. The method of claim 5, wherein the domain manager receives one or more requests for tokens for a second domain.

8. The method of claim 1, wherein the centralized domain service revokes the domain identification.

9. A computer program product for use at a central domain server in a rights management system that protects content from being consumed by unauthorized devices in a wide area network, the central domain server configured to enforce domain membership for other computing devices that request access to digitally protected content in the wide area network, the computer program product of implementing a method of enforcing digital rights within the confines of a content license used when consuming content within a domain by validating domain membership criteria set by a content provider, the computer program product comprising one or more computer hardware storage devices having stored thereon computer-executable instructions that, when executed at a processor, cause the central domain server to the perform the method, including the follow:

receive a first request from a first computing device for creating a domain and for receiving a domain identification for the domain;

in response to the first request, create a first domain certificate for the first computing device, the first domain certificate including the domain identification, the domain identification uniquely binding content licenses to the domain, the content licenses comprising one or more usage rights that define how content associated with the licenses may be consumed by any members of the domain;

send the first domain certificate to the first computing device such that the first computing device is established as a member of and the domain manager for the domain;

subsequently receive a second request generated by the second computing device, the second request for the second computing device becoming a member of the domain and for the second computing device receiving the domain identification, the second request including device specific information uniquely identifying the second computing device;

in response to the second request, the central domain server enforcing digital rights by validating domain membership criteria set by the content provider through at least both of (1) a velocity check that determines how many requestors have both joined and unjoined from the domain within a predetermined period of time; and (2) a proximity check that checks how close the second computing device is to the first computing device, the domain membership criteria defines a minimum proximal closeness required of the second computing device relative to the first computing device;

upon validation of the domain membership criteria that a predetermined frequency of requestors both joining and unjoining the domain over the predetermined period of time has not been exceeded, the central domain server creating a second domain certificate for the second computing device, the second domain certificate including the device specific information and the domain identification;

the central domain server sending the second domain certificate to the second computing device for establishing the second computing device as member of the domain;

the central domain server receiving a third request from the content provider for verifying the domain identification, the third request including the domain identification sent by the content provider when the content provider receives a request for content from a member of the domain; and in response to the third request, the central domain server sending a verification to the content provider that the domain identification is valid, such that the central domain server centrally regulates content access for both the first and second computing devices through membership in the domain in accordance with the desires of the content provider.

10. The computer program product of claim 9, wherein the domain identification expires within a time period set by the centralized domain service.

11. The computer program product of claim 10, further comprising the acts of:
receiving, at the centralized domain service, a renewal request to extend the domain identification expiration time period.

12. The computer program product of claim 9, wherein the domain membership criteria further includes at least one of a total number of requestors to join the domain and unjoin from the domain.

13. The computer program product of claim 9, wherein receiving the second request includes receiving the proximity data in the second request, and wherein receiving the proximity data includes identifying at least one of the time it took a token that includes the proximity data to travel from the first computing device to the second computing device, or the number of intermediary nodes that the token traveled across between the first computing device and the second computing device.

14. The computer program product of claim 13, wherein the centralized domain service includes the domain manager, and wherein the domain manager requested the creation of the domain from a centralized domain server, which created the domain identification.

15. The computer program product of claim 13, wherein the domain manager receives one or more requests for tokens for a second domain.

16. The computer program product of claim 9, wherein the centralized domain service revokes the domain identification.

17. The method of claim 5, wherein the minimum network proximity includes at least one of a minimum time for the token to travel from the first computing device to the second computing device, or a minimum number of intermediary nodes for the token travel across between the first computing device and the second computing device.

18. The computer program product of claim 13, wherein the minimum network proximity includes at least one of a minimum time for the token to travel from the first computing device to the second computing device, or a minimum number of intermediary nodes for the token travel across between the first computing device and the second computing device.

19. A rights management system that protects content from being consumed by unauthorized devices in a wide area network, the rights management system configured to enforce domain membership for other computing devices that request access to digitally protected content in the wide area network, the system comprising:
   a central domain server;
   a first membership computing device;
   a second membership computing device;
   a content provider computing device,
   wherein the central domain server, the first membership computing device, the second membership computing device and the content provider computing device include one or more processors and one or more physical computer readable media having stored thereon computer executable instructions that are configured to be executed by the one or more processors to cause the following;
      the first membership computing device to provide a first request to the central domain server, the first request including a request that the central domain server create a domain and provide a domain identification to the first membership computing device;
      the central domain server to receive the first request and create a first domain certificate for the first membership computing device, the first domain certificate including the domain identification, the domain identification uniquely binding content licenses to the domain, the content licenses comprising one or more usage rights that define how content associated with the licenses may be consumed by any members of the domain;
      the central domain server to send the first domain certificate to the first membership computing device;
      the first membership computing device to receive the first domain certificate and upon receipt, to be established as a member of and the domain manager for the domain;
      the first membership computing device to generate a token including proximity data indicative of the network proximity of the second membership computing device relative to the first membership computing device upon receipt of a domain membership request from the second membership computing device;
      the second membership computing device to provide a domain membership request to the first membership computing device and, in response to the membership request, to receive the token from the first membership computing device;
      the second membership computing device to send a second request to the central domain server, the second request including device specific information uniquely identifying the second membership computing device and the token, the second request including a request that the central domain server allow the second membership computing device to become a member of the domain and to provide the domain identification to the second membership computing device;
      the content provider computing device to send domain membership criteria to the central domain server;
      the central domain server to receive the second request and to receive the domain membership criteria and in response enforce digital rights by validating the domain membership criteria through at least both of (1) a velocity check that determines how many requestors have both joined and unjoined from the domain within a predetermined period of time; and (2) a proximity check that checks how close the second computing device is to the first computing device, the domain membership criteria defines a minimum proximal closeness required of the second computing device relative to the first computing device;
      the central domain server to, upon validation of the domain membership criteria including a determination that a predetermined frequency of requestors both joining and unjoining the domain over the predetermined period of time has not been exceeded, create a second domain certificate for the second membership computing device, the second domain certificate including the device specific information and the domain identification, and to send the second domain certificate to the second membership computing device;
      the second membership computing device to receive the second domain certificate and upon receipt, to be established as a member of the domain;
      the content provider computing device to receive a request for content from the first or second membership computing devices in response to the request for content, send a third request to the central domain server, the third request including the domain identification and a request to verify the domain identification; and
      the central domain server to receive the third request from the content provider computing device and in response to the third request, send a verification to the content provider computing device that the domain identification is valid, such that the central domain server is configured to centrally regulate content access for both the first and second membership computing devices through membership in the domain in accordance with the desires of the content provider computing device.

* * * * *